(12) United States Patent
Forster et al.

(10) Patent No.: US 12,693,649 B2
(45) Date of Patent: Jul. 28, 2026

(54) IDENTIFICATION OF MODEL PARAMETERS FOR A MANUFACTURING MACHINE, AND USE THEREOF FOR DETERMINING OPTIMISED TRAJECTORIES

(71) Applicant: Siemens Aktiengesellschaft, Munich (DE)

(72) Inventors: Gerhard Forster, Schwarzenbruck (DE); Andreas Klotzek, Erlangen (DE); Alexander Kubik, Erlangen (DE); Uwe Ladra, Erlangen (DE); Philipp Rost, Fürth (DE); Elmar Schäfers, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 360 days.

(21) Appl. No.: 18/294,901

(22) PCT Filed: Jul. 7, 2022

(86) PCT No.: PCT/EP2022/068818
§ 371 (c)(1),
(2) Date: Feb. 2, 2024

(87) PCT Pub. No.: WO2023/011832
PCT Pub. Date: Feb. 9, 2023

(65) Prior Publication Data
US 2024/0427306 A1 Dec. 26, 2024

(30) Foreign Application Priority Data

Aug. 5, 2021 (EP) ..................................... 21189898

(51) Int. Cl.
G05B 19/401 (2006.01)
G05B 19/404 (2006.01)

(52) U.S. Cl.
CPC .......... G05B 19/401 (2013.01); G05B 19/404 (2013.01); *G05B 2219/39181* (2013.01); *G05B 2219/40527* (2013.01)

(58) Field of Classification Search
CPC ................ G05B 19/401; G05B 19/404; G05B 2219/39181; G05B 2219/40527
See application file for complete search history.

(56) References Cited

U.S. PATENT DOCUMENTS

2007/0046238 A1* 3/2007 Xu ...................... G05B 19/4163
318/571
2013/0338807 A1* 12/2013 De Schepper ..... G05B 19/4145
700/96

(Continued)

FOREIGN PATENT DOCUMENTS

EP 3176657 A1 6/2017

OTHER PUBLICATIONS

Shen Jinhua et al: "Trajectory Optimization Algorithm based on Robot Dynamics and Convex Optimization", 2019 IEEE 3rd Advanced Information Management, Communicates, Electronic and Automation Control Conference (IMCEC), IEEE, Oct. 11, 2019 (Oct. 11, 2019), Seiten 1583-1588, XP033705181, DOI: 10.1109/IMCEC46724. 2019.8983817 [found on Feb. 4, 2020].

(Continued)

*Primary Examiner* — Hussein Elchanti
(74) *Attorney, Agent, or Firm* — Henry M. Feiereisen LLC

(57) ABSTRACT

A method parametrizes a model of a manufacturing machine of a manufacturing machine system. The manufacturing machine has at least one axis with a position-controlled drive, by which at least a first machine element can be adjusted relative to a second machine element. A maximum movement range, a maximum movement speed for the axis and a maximum electrical power that can be supplied to the (Continued)

drive of the axis are recorded, as boundary conditions for an identification run, in a control device comprised by the manufacturing machine system.

18 Claims, 8 Drawing Sheets

(56)                    References Cited

U.S. PATENT DOCUMENTS

| | | | |
|---|---|---|---|
| 2017/0235294 A1* | 8/2017 | Shapiro | B23K 26/032 |
| | | | 700/97 |
| 2017/0308058 A1* | 10/2017 | Kreidler | G05B 19/4163 |
| 2018/0150062 A1* | 5/2018 | Shapiro | G05B 19/4093 |
| 2019/0018390 A1 | 1/2019 | Bitterolf et al. | |
| 2020/0290467 A1* | 9/2020 | Gao | H04B 5/79 |
| 2021/0349437 A1* | 11/2021 | Liu | G05B 19/406 |
| 2022/0308562 A1* | 9/2022 | Norman | G05B 19/4097 |
| 2023/0057688 A1* | 2/2023 | Bretschneider | B23Q 15/12 |
| 2023/0191705 A1* | 6/2023 | Wedemeyer | B29C 64/393 |
| | | | 700/98 |
| 2023/0315034 A1* | 10/2023 | Aizawa | G06F 3/14 |
| | | | 700/275 |

OTHER PUBLICATIONS

Jingfu, Jin et al: "Parameter identification for Industrial robots with a fast and robust trajectory design approach"; Robotics and Computer Integrated Manufacturing; vol. 31. Feb. 1, 2015 (Feb. 1, 2015), pp. 21-29, XP055878171.

* cited by examiner

IDENTIFICATION OF MODEL PARAMETERS FOR A MANUFACTURING MACHINE, AND USE THEREOF FOR DETERMINING OPTIMISED TRAJECTORIES

CROSS-REFERENCES TO RELATED APPLICATIONS

This application is the U.S. National Stage of International Application No. PCT/EP2022/068818, filed Jul. 7, 2022, which designated the United States and has been published as International Publication No. WO 2023/011832 A1 and which claims the priority of European Patent Application, Serial No. 21189898.6, filed Aug. 5, 2021, pursuant to 35 U.S.C. 119 (a)-(d).

BACKGROUND OF THE INVENTION

The invention relates to a method for operating a manufacturing machine of a manufacturing machine system, wherein the manufacturing machine has at least one axis with a position-controlled drive by means of which at least a first machine element can be adjusted relative to a second machine element, wherein at least a maximum movement range and a maximum movement speed for the axis and a maximum electrical power that can be supplied to the drive of the axis are stored as boundary conditions for at least one identification run in a control facility comprised by the manufacturing machine system.

The conventional design of machine axes usually takes place in the planning or design stage by means of appropriate software tools, i.e., before the machine is built. Many parameters of the machine axes or the position-controlled drives thereof, such as, for example, friction, are not known in advance and can at most be estimated with a large safety factor. As a result, the optimum possible movement, for example in the minimum time at the possible torque limit, is not achieved after commissioning when moving the machine axes.

Once the machine has been set up and put into operation, nowadays the parameters of the drive axes are set manually in an iterative process. This is a time-consuming and expensive procedure. Herein, an experienced commissioning engineer usually reaches the optimum range, but this method is very subjective and settings can also differ from one commissioning engineer to the next.

EP 3 176 657 A1 discloses a machine tool or production machine in which the rigidity of a drive train for linear movement of a machine component along a linear guide of the machine is ascertained. Herein, the drive train comprises a motor with a motor-measuring system and the linear guide is assigned a length-measuring system for determining the position of the machine components, wherein the machine furthermore comprises a numerical control system for regulating the movement of the machine component. The rigidity of the drive train is determined by specifying a constant acceleration for the machine component by means of the numerical control system, the numerical control system determines a difference between a position of the machine component derived from the motor-measuring system and a position of the machine component measured at the same time by the length-measuring system during the acceleration phase and the difference is assigned to the acceleration or to a force required for the acceleration and the value pair ascertained in this way and/or a rigidity value emanating from the value pair is stored in the numerical control system.

The publication JIN JINGFU ET AL: "Parameter identification for industrial robots with a fast and robust trajectory design approach", Feb. 1, 2015, discloses dynamic parameter identification for modeling an industrial robot with the steps of modeling the system dynamics, joint position/torque data acquisition and filtering, experimental design, estimation of dynamic parameters and validation. In particular, this proposes a computationally efficient and intuitive optimization criterion for designing the robot's excitation trajectory.

It is the object of the invention to simplify the commissioning of a manufacturing machine that has at least one axis with a position-controlled drive.

SUMMARY OF THE INVENTION

This object is achieved by a method for operating a manufacturing machine of a manufacturing machine system, wherein the manufacturing machine has at least one axis with a position-controlled drive by means of which at least a first machine element can be adjusted relative to a second machine element, wherein at least a maximum movement range and a maximum movement speed for the axis and a maximum electrical power that can be supplied to the drive of the axis are stored as boundary conditions for at least one identification run in a control facility comprised by the manufacturing machine system, wherein the following steps are executed by means of the control facility:

- determining or receiving a maximum acceleration and/or a maximum jerk for the identification run,
- determining a travel profile for the identification run in compliance with the boundary conditions and the maximum acceleration and the maximum jerk for the identification run,
- performing the identification run according to the ascertained travel profile,
- ascertaining the current supplied to the drive during the identification run,
- ascertaining a current limit and/or a torque limit of the drive in dependence on a rotational speed of the drive,
- ascertaining at least one actual kinematic variable during the identification run,
- ascertaining at least one model parameter of at least one model of the axis in dependence on the ascertained current and the actual kinematic variable,
- ascertaining at least one trajectory of the axis optimized with respect to a minimum travel time or a maximum acceleration or a minimum energy loss on the basis of the model and the current limit and/or torque limit.

The object is furthermore achieved by a manufacturing machine system with a manufacturing machine and a control facility connected thereto for performing such a method. Herein, the control facility in particular comprises suitable software so that, as a result of this software being called up, the aforementioned steps are executed by means of the control facility.

The invention also relates to a manufacturing machine for such a manufacturing machine system.

The invention further relates to a control facility for such a manufacturing machine system.

Moreover, the invention relates to a digital twin of a manufacturing machine of such a manufacturing machine system.

The person skilled in the art understands a manufacturing machine to be a machine used for automated manufacturing. This includes in particular production machines, machine tools or robots. A manufacturing machine used in connection with the invention comprises at least one position-controlled axis, so at least a first machine element directly connected to the drive can be adjusted relative to a second (further) machine element of the manufacturing machine by means of a position-controlled drive assigned to the axis.

Preferably, a manufacturing machine of a manufacturing machine system according to the invention, for example a machine tool or a robot, comprises more than one, in particular at least five, position-controlled axes, by means of which an end effector, for example a tool, can be positioned and oriented in space.

In addition to the manufacturing machine, the manufacturing machine system comprises a control facility connected thereto, which ensures position control of the axis according to a program (control program).

Machine tools or robots are nowadays controlled with the help of a control facility in the form of a CNC. Herein, the control facility uses a parts program to "control" the movements of machine elements and thus the movements of a tool, which is inserted into the machine using a tool-holding apparatus, for example, relative to a workpiece, which is likewise inserted into the machine. Herein, it is clear to the person skilled in the art that the term "control" relates to normal linguistic usage and not to "control" in the sense of control engineering. Here, "control" primarily means the position control of axes, behind which are concealed control processes in the sense of control engineering.

Herein, the parts program consists at least predominantly of control commands that are read and interpreted by the control facility. According to the control commands, the control facility controls the movements of the machine elements of the machine tool and thus the movement of the tool relative to the workpiece.

Herein, to create a parts program, a CAM system (computer aided manufacturing system) generates movement information, preferably in a standardized data format, about tool movements to be performed and this information is read by a downstream post processor. The post processor uses movement information generated by the CAM system, the kinematic data and machine data of the machine tool and the command set of the CNC and the command set of the PLC to generate a parts program adapted for the respective specific machine tool on which the machining process is to take place in the form of control commands adapted to the specific control facility of the machine tool. In such a way, the post processor converts the movement information generated by the CAM system, preferably in a standardized data format, into control commands, that can be read by the control facility and are adapted to the respective control facility.

Herein, in addition to the specific CNC command set available, the post processor takes into account the machine-specific circumstances of the machine tool, such as, for example, kinematics, geometric proportions, maximum movement ranges of the drive axes and maximum speeds of the machine elements. This data is available in the form of machine data. Furthermore, during the generation of the control commands, the post processor takes account of PLC (programmable logic control) functionalities, such as, for example, lubrication, tool changes, door interlocking etc., wherein the specific PLC functionalities available are provided to the post processor in the form of PLC command sets.

To enable the control facility connected to the manufacturing machine to plan and control the movements to be performed by the manufacturing machine very precisely, an exact model of the manufacturing machine, which maps the mechanical and dynamic properties of the machine very precisely, must be stored in the control facility.

This application describes a method for ascertaining the necessary mechanical and electrical parameters of the drive axis on a metrological basis on an existing machine using an identification process, wherein first the dynamic parameters for a reliable identification run of the respective axis are ascertained in compliance with predetermined boundary conditions of the drive axes.

In contrast to the above-described procedure in which the movements to be executed by the machine during operation are generally determined by an external CAM system, here, the trajectories for the identification runs of the individual axes are determined directly on the machine's control facility. This preferably takes place by means of software installed on the control facility to guide the operator step-by-step through the commissioning process via a graphical user interface on the control facility.

Accordingly, to commission the manufacturing machine, first, an identification run is performed. This means that the axis (or axes) of the machine is moved in compliance with specified or prespecifiable boundary conditions during which measured values are generated and evaluated, thereby resulting in the model parameters required by the controller to determine optimized trajectories for the ongoing operation of the machine, i.e., after commissioning.

Usually, a manufacturing machine comprises a plurality of position-controlled axes, hereinafter also referred to as drive axes, by means of which an end effector of the machine can be positioned in a working space of the machine. The aim of the invention is to ascertain the required model parameters for all drive axes of the machine. Herein, at least one identification run can be ascertained and performed for each individual axis in an identification process. Accordingly, the axes are moved individually one after the other. However, it is also possible to move a plurality of drive axes, in particular all drive axes, of the machine, simultaneously in an identification process, so that identification runs of individual axes are executed at the same time.

First, parameters for a reliable identification process, i.e., reliable identification runs, are ascertained from known boundary conditions for the respective axis, in particular all drive axes. These boundary conditions comprise at least the positions of the end position switches of the axes, which define the maximum movement range of the respective axis. Furthermore, the maximum (movement) speed of the axis in question is defined by the drive data of the axis in question, such as, for example, a maximum motor rotational speed in conjunction with a specific transmission ratio.

Furthermore, a reliable identification run requires at least rough knowledge of the inertia of the axis and converter parameters. The converter parameters can comprise the maximum current of the converter, the maximum current of the motor or the maximum permissible torque of the motor. The latter can, for example, be defined by the machine manufacturer, for example from a maximum permissible torque of a gear in the drive train. This data is generally provided in the converter and can be read therefrom via existing interfaces and transferred to the control facility. A relatively rough estimation is sufficient for the inertia of the axis, in particular the moment of inertia applied to the drive of the axis. This can, for example, be obtained from the known masses moved by means of the axis. If such data is available in the control facility, this it can itself determine values for maximum acceleration and/or maximum jerk for the identification run. Furthermore, it is possible for the control facility to determine the inertia for each axis by means of a short "test run" in which the axis is accelerated for a short period and for a short distance for test purposes. For this test run, it is, for example, possible for a relatively low acceleration that can be reliably executed by the axis to be stored in the control facility, for example $a_{test}=1.0$ m/s². Furthermore, it is possible for the expertise of the machine operator to be used as the basis for an initial estimation of the inertia of the axis or an initial estimation of suitable values for the maximum acceleration or maximum jerk for the identification run and to enter the corresponding values manually directly into the control facility, whereby the latter receives the corresponding values. If an initial estimation of inertia is specified for the control facility, it can automatically determine therefrom, in conjunction with the drive data, suitable values for a maximum acceleration and/or maximum jerk for the identification run.

Regardless of which of the methods described was used to determine suitable values for a maximum acceleration and/or a maximum jerk for the identification run or to feed them to the control facility, these values should be provided with a high "safety factor", for example not exceed 50% of the expected values of these parameters for the real operation of the machine. The safety margin is required because the friction is not known and furthermore because the field weakening that takes effect at high motor rotational speeds reduces the available torque. Like the friction, the reducing effect of the field weakening over the rotational speed of the motor cannot be specified with sufficient precision without measuring, but of course influences the acceleration capacity.

The parameters maximum movement path, maximum speed, maximum acceleration and maximum jerk for the identification run are determined for each drive axis such that a reliable identification run is ensured. Since the maximum acceleration (maximum possible acceleration of the axis) is not yet known, a reliable but sufficiently high initial value, i.e., the maximum acceleration for the identification run, is ascertained, in particular estimated, from the known motor data and used. Likewise, a maximum jerk is specified for the identification run, in particular ascertained or estimated from the motor data, which can be achieved by the drive of the axis with high (almost certain) probability. Advantageously, the aforementioned initial values are automatically determined from the available motor data and converter data by the aforementioned software.

Then, a travel profile for the identification run is determined in compliance with the boundary conditions and the maximum acceleration and the maximum jerk for the identification run. Preferably, this step is also carried out automatically by means of the aforementioned software.

Identification then takes place automatically based on the ascertained parameters, typically in two identification runs (measuring runs) with different travel profiles for each drive axis, once at medium speed and/or medium acceleration and once at high speed and/or high acceleration, in order to cover all possible working ranges of the machine axes and obtain good models. Identification only takes a few minutes and provides a very good map of the real machine axes. Preferably, the travel profile for each axis is determined such that the axis is moved once in a first axis direction, for example the positive axis direction, at medium speed and medium acceleration and then in the opposite axis direction, for example the negative axis direction, at high speed and high acceleration. Herein, preferably, the axis is moved over at least a significant range of its maximum movement path.

During the identification run, at least one current value is measured and recorded at least at a certain point in time.

However, generally, a plurality of current values, in particular a large number of current values, are measured and recorded during the identification run, in particular in dependence on the time.

In addition to the current, at least one actual kinematic variable is required to ascertain at least some of the model parameters. This includes the position or the speed or the acceleration or the jerk of the axis during the identification run. These variables can be ascertained in different ways.

On the one hand, these variables can be taken from the specified travel profile of the identification run directly from the controller's specifications, for example the position setpoint values of the axis, and be considered to be given.

However, it is more reliable also to ascertain at least the position of the axis in dependence on the time during the identification run on a metrological basis. Advantageously, a large number of measurements are also carried out here, preferably at least approximately at the same points in time at which the current is measured.

When determining the variables position, speed, acceleration or jerk, it is sufficient simply to know the course of the position in dependence on the time. The variables speed, acceleration or jerk can be mathematically calculated therefrom by means of the first or second derivative. However, alternatively, it is also possible to capture at least one of the variables speed, acceleration or jerk on a metrological basis by means of appropriate sensors.

During the identification run, the current consumption of the axis drive is advantageously determined at specific time intervals, for example every 2 ms. Furthermore, the motor rotational speed is determined for the time point of the respective measurement. The motor rotational speed at the respective time point can either be read from the converter or calculated from the ascertained position values.

Of particular interest in connection with the invention are the current values, in particular the torque-forming current, or the torque in dependence on the motor rotational speed. In particular, a torque characteristic curve or current characteristic curve is determined in dependence on the motor rotational speed. The relationship between current and torque is generally precisely known for the motors used. Therefore, the values can be easily converted into one another. In particular, there is an at least substantially linear relationship between the current and the torque in the operating range of the motor that is relevant for the identification run.

Different model parameters can be derived from the different phases of the identification run. For example, a run at a constant speed provides information about the friction present on the axis in question. Furthermore, a run with constant acceleration provides information about the total inertia of the axis in question. Herein, the total inertia of the axis should be understood to be the sum of (all) masses and moments of inertia that counteracts the drive of the axis when the axis accelerates.

It is known that there is a large number of ways for describing a machine or the behavior of a machine, in particular at least one axis of the machine, using a model.

With regard to modeling methods, reference is made to the extensive specialist literature on this topic. Herein, a common method involves describing known relationships between physical variables in an apparatus, which can be determined by measurements, using mathematical terms. With this procedure, the aim of the modeling is to determine the parameters of the terms such that the terms reflect the measurements on the specific apparatus as well as possible, i.e., for example such that the deviations between measurements and terms are minimized on average for a large number of measurements performed on the specific apparatus.

A frequently used option in practice for modeling in connection with drives involves describing the torque $M_{Phys}$ applied to the drive of an axis using the following equation:

$$M_{Phys} = J \cdot a_{Mot} + M_c \cdot \text{sgn}\, n_{Mot} + M_v \cdot n_{Mot} + M_h$$

Herein: J is the total inertia, $M_c$ is the Coulomb friction, $M_v$ is the viscous friction, $M_h$ is the holding torque, for example of a suspended axis, $a_{Mot}$ is the motor acceleration and $n_{Mot}$ is the motor rotational speed.

Provided that values are available for the parameters contained therein, the correlation given by the above relationship of the physical variables can be referred to as a mechanical model of the axis.

Similar terms can be specified for the losses of the drive or the current limit or torque limit of the drive in dependence on the rotational speed, from which a loss model or a limit model can be derived for the specific drive.

The model parameters of the mechanical model, which are ascertained from the identification runs by means of the aforementioned measurements for the individual axes, include: the friction (viscous/dry friction) present in the drive, the saturation behavior of the motor (obtained from the relationship between torque-forming current and the physical torque), forces due to weight force or due to weight compensation (for example with a suspended axis), the actual inertia of the axis (if necessary, correction of the previously assumed inertia) or the field weakening behavior of the motor.

The model or the model parameters can then be used to determine the maximum acceleration $a_{max}$ or the maximum jerk $j_{max}$—possibly in dependence on a load or loading of the axis—for the drive in question of the axis and for a specifically specified movement path of the axis such that the physical possibilities of the motor or the drive are fully utilized. Herein, in particular, $a_{max}$ of $j_{max}$ depends on the maximum motor rotational speed that can be achieved during the movement of the axis over the movement path.

In one embodiment of the invention, at least in one section of the identification run, the travel profile is determined such that the axis does not exceed 60%, preferably 50%, of the maximum movement speed and/or 60%, preferably 50%, of the maximum acceleration for the identification run. As a result, the above-described run is realized at medium speed and/or medium acceleration.

In one embodiment of the invention, at least in one section of the identification run, the travel profile is determined such that the axis does not fall below 70%, preferably 80% of the maximum movement speed and/or 70%, preferably 80%, of the maximum acceleration for the identification run. As a result, the above-described run is realized at high speed and/or high acceleration.

One embodiment of the invention provides that, in addition to the boundary conditions maximum movement path, maximum speed, maximum acceleration and maximum jerk for the identification run, a maximum moment of inertia of the axis for the identification run is stored in the controller as a further boundary condition. This expands the possibilities for determining the travel profile for the identification run. In a preferred embodiment, the maximum moment of inertia for the identification run is stored in the control facility in dependence on the axis position. The maximum moment of inertia for the identification run is in particular used, in conjunction with the known drive data (maximum current, maximum torque, transmission ratio etc.), to determine the dynamic parameters maximum acceleration and/or maximum jerk for the identification run such that the identification run can be performed reliably and, in particular, the drive does not reach its limits.

The aim of the identification run is to determine model parameters or a model of the manufacturing machine and in particular models of the machine axes which can be used when determining trajectories for the normal operation of the machine. These model parameters include the friction or a moment of inertia of the axis in question, possibly also in dependence on the respective axis position. These parameters determine the mechanical model of the axis or the machine.

Furthermore, in connection with the invention, a current limit is determined in dependence on the motor rotational speed for the drive of the respective axis. This relationship is described by the so-called limit model of the drive in question. Preferably, the respective limit model is also ascertained from the corresponding identification run. Herein, the associated motor rotational speed and the distance to the maximum current at the rotational speed in question are also read out for a measured current value from the drive's frequency converter and supplied to the control facility. This rotational-speed-dependent distance to the maximum current, the so-called "reserve", is a variable that is usually already present in the frequency converter and therefore only needs to be read from the converter and supplied to the control facility.

However, alternatively, if available, data sheets can also be used to determine the torque limit or current limit of the respective motor. Thus, the limit characteristic curve of the motor (the limit model) can also be determined from the motor data by means of a motor model or also supplied directly by the motor manufacturer.

The limit characteristic curve is limited not only by the motor itself, but possibly additionally by the maximum current of the converter and by the maximum permissible torque of the mechanics, such as, for example, the gear. These parameters may then also have to be included in the limit characteristic curve so that overall lower maximum permissible motor currents in dependence on the rotational speed can result than would be the case if only the motor were considered.

In addition, a reduction factor ("reserve") can be specified for safety reasons, for example, if only 90% of the limit characteristic curve of the motor is to be utilized. The characteristic curve shifted by the reserve in the negative torque direction compared to the limit characteristic curve can be referred to as the reserve limit characteristic curve.

One embodiment of the invention provides that at least one parameter relating to the losses of an axis or the drive of the axis or a corresponding characteristic curve be combined in a loss model in the control facility. The criterion for the loss model is the minimization of the power loss, i.e., minimum motor heat generation. For this purpose, the copper and iron losses from the motor in question are calculated from the measurement data obtained during the identification runs. The copper losses are dependent on the current or torque squared, while the iron losses are dependent on the rotational speed. The characteristic curves obtained in this way are then used for energy-optimized movement with optimum utilization of the motor power. The parameters of the loss model are in particular ascertained based on the measurement of the motor current during the identification run in the regions of the travel profile with high speeds or high acceleration, which generate high loading on the motor. Herein, saturation effects are captured since, at high currents, the torque is no longer linearly dependent on the current. The saturation characteristic curve is typified as follows: the higher the current, the lower the increase in the generated torque with increasing current.

The invention can be used with almost any manufacturing machine with at least one position-controlled axis. However, the invention is particularly advantageous for production machines with a plurality of axes provided in each case with a position-controlled drive by means of which in each case at least two machine elements can be adjusted relative to one another, wherein an end effector of the manufacturing machine can be positioned in a working space of the manufacturing machine by means of the axes and wherein the parameters of characteristic curves of all axes of the manufacturing machines involved in the positioning of the effector are stored in the respective model.

Each additional axis increases the effort involved in commissioning the machine. The invention helps to significantly reduce this effort, especially in the case of machines with numerous axes.

After commissioning, the invention can be used not only to determine trajectories for the (regular, ongoing) operation for the individual axes of the machine to be determined on the basis of the identified model(s) in an optimized manner, but also trajectories for the end effector, for the movement of which, in the ongoing operation of the machine, generally a plurality of axes are moved in combination (interpolating). Here, once again, the trajectories are determined and optimized in dependence on at least one of models generated according to the invention.

Advantageously, in connection with the invention, it is also possible to use position setpoint value filters to smooth a travel profile, both for the identification run and for (regular, ongoing) operation.

The invention helps to determine model parameters for the drives of a manufacturing machine in a simple manner. Herein, the model parameters match the circumstances on the real machine with a high degree of accuracy.

The model parameters are then used to determine optimized travel profiles for the regular (ongoing) operation of the manufacturing machine so that it performs the task to be executed by the machine in an optimized manner. Depending on requirements, it is, for example, possible to realize time-optimized or energy-optimized travel profiles. Herein, the generation of the travel profiles on the basis of a model of the machine or on the basis of the model parameters is well known to the person skilled in the art from the prior art.

In summary, the result of the identification process is a mechanical model describing the inertia conditions and friction conditions of the axis. The identified limit model describes the electrical limits of the drive axis, i.e., motor limits with saturation including limits of the power section. The ascertained loss model substantially describes the rotational-speed-dependent power loss of the motor and forms the basis for further consideration of energy-optimized movement processes to conserve resources to the greatest possible degree.

The identified models and further input variables, such as, for example, movement path and loading, are then used as the basis for automatically calculating, for the normal operation of the machine, the dynamic parameters (position, speed, acceleration, jerk) when positioning machine axes according to various criteria, such as, for example, achieving the maximum possible acceleration with the drive, moving the axis in the minimum time, for optimum motor utilization. The optimum acceleration, optimum jerk and possibly further parameters can be determined for any operating state during ongoing operation of the machine, even though only one identification process has taken place.

The models ascertained during identification can also be referred to and used for other calculations, simulations and optimizations both on the real machine and for the digital twin.

BRIEF DESCRIPTION OF THE DRAWING

The invention is described below in more detail with reference to exemplary embodiments. Herein, the figures show in.

DETAILED DESCRIPTION OF PREFERRED EMBODIMENTS

Figure 1:
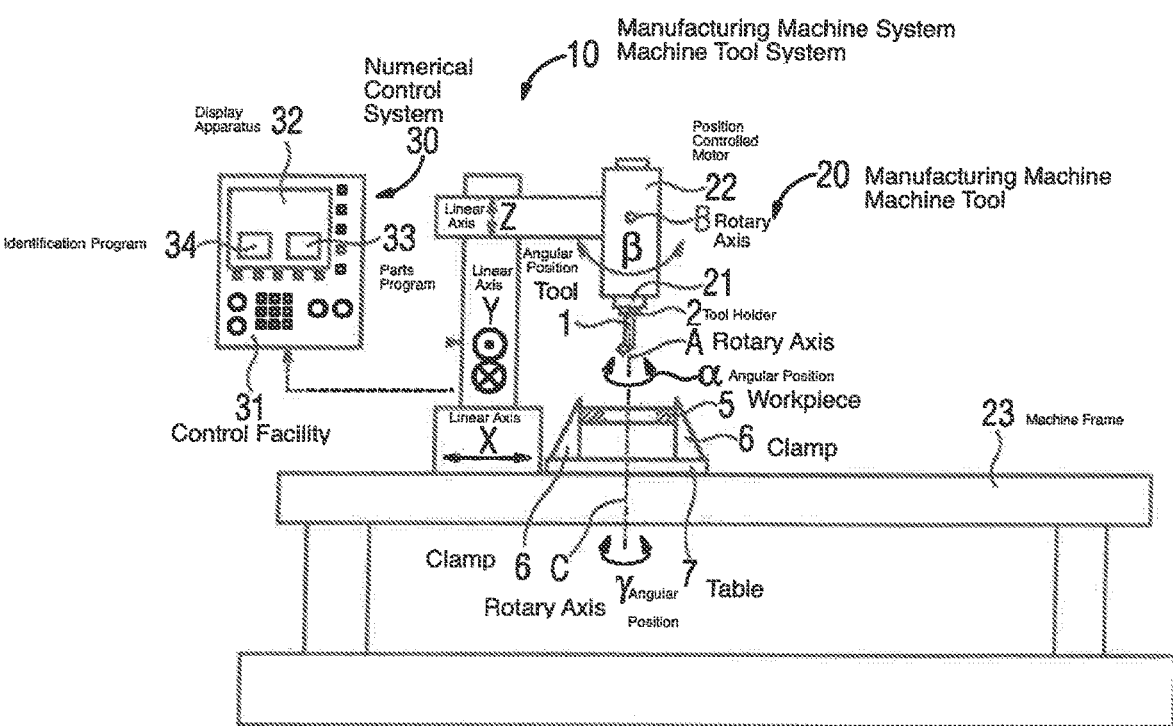
FIG. 1 a machine tool system with a numerically controlled machine tool.

FIG. 1 is a schematic depiction of a manufacturing machine system according to the invention in the form of a machine tool system 10 with a manufacturing machine in the form of a machine tool 20 and control facility connected thereto in the form of a numerical control system or CNC 30.

In the exemplary embodiment, the machine tool 20 has six machine axes by means of which a relative movement can be performed between a tool 1, which in the exemplary embodiment is in the form of a turning tool 1, and a workpiece 5, for example a valve seat of a shut-off valve. Herein, the tool 1 is clamped in a tool holder 2, which is connected to a tool spindle 21 driven by a position-controlled motor 22. The workpiece 5 is fastened to a workpiece table 7 by clamping means 6.

The turning tool 1 can be moved in a position-controlled translatory manner in the X, Y and Z directions with the machine tool 20 shown in the exemplary embodiment by means of drives that are not shown in FIG. 1 for the sake of clarity. In addition to the three linear axes, the machine tool 20 furthermore comprises the two position-controlled rotary axes A and B, likewise shown in FIG. 1, with which the tool 1 can be rotated about the respective axis and can also be aligned relative to the workpiece 5 in a position-controlled manner through the angular positions α and β.

Moreover, the machine tool 20 has a third position-controlled rotary axis C, which extends parallel to the Z axis, and in respect of which the workpiece table 7 is rotatably mounted relative to a stationary machine frame 23. As a result, the workpiece 5 can also be positioned in an angular position γ relative to the tool 1. Here, once again, the drive is not depicted for the sake of clarity.

Depending upon the machining to be performed, rotational-speed-controlled operation with respect to the rotary axes A and/or C is also possible in the case of the machine tool 20 shown.

The machine tool 20 according to the exemplary embodiment thus has six machine axes (the 3 linear axes X, Y and Z and the 3 rotary axes A, B and C), i.e., it is a so-called 6-axis machine tool (6-axis machine) 20.

It should be noted at this point that the machine tool 20 can of course also have more or fewer than six machine axes.

The machine tool 20 is connected to the CNC 30, which uses a parts program 33 and/or manual input to ascertain position setpoint values x, y, z, $\alpha$, $\beta$ and $\gamma$ to control a relative movement that takes place between the tool 1 and the workpiece 5. The CNC 30 ascertains the position setpoint values using the parts program 33 in which the movement to be carried out by the tool 1 in respect of the workpiece 5 is defined in the form of commands. Alternatively or additionally, the movement of the tool 1 and/or the workpiece 5 can also be specified by an operator on site at the machine tool 20 by means of manual input via a control facility 31 in conjunction with a display apparatus 32 of the numerical control system 30. For this purpose, the control facility 31 in particular has input fields, buttons and rotary controls.

Herein, the parts program 33 is usually generated by an external CAM/CAD system (not depicted) and a so-called post processor (not depicted) that may be connected downstream of the CAM/CAD system outside the numerical control system 30 and transferred from there to the numerical control system 30.

During the execution of the parts program 33, the numerical control system 30 generates position setpoint values x, y and z for the linear axes and $\alpha$, $\beta$ and $\gamma$ (angular positions) for the rotary axes in a specific cycle, the interpolation cycle. These position setpoint values are used to move the tool 1 along a movement path with a specified orientation relative to the workpiece 5.

One aim of the invention is to identify model parameters for models of the manufacturing machine 20 stored in the CNC 30 of the machine tool system 10 in a simple manner. Based on these models, the CNC 30 generates optimized trajectories for the movement of the tool 1 relative to the workpiece 5 for machining the workpiece 5.

To identify the model parameters, the CNC 30 has an identification program 34, on the basis of which the procedure described below is executed when the program has been called up.

Figure 2:
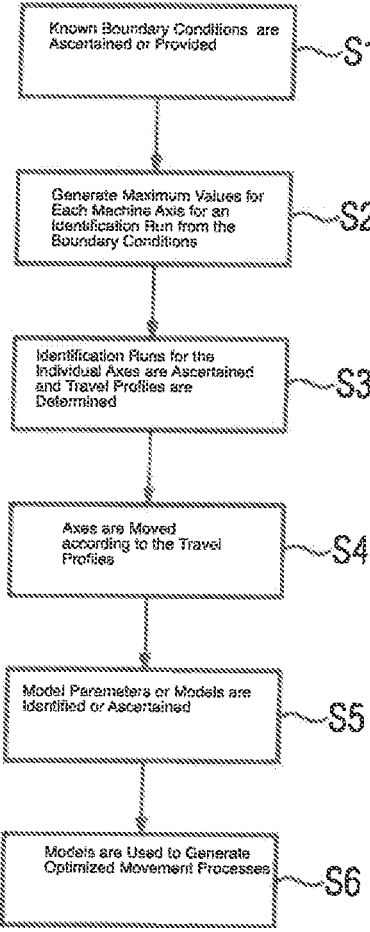
FIG. 2 method steps in the performance of a method according to the invention.

FIG. 2 shows the main method steps in the determination of an optimized trajectory for a tool 1 guided by the machine tool 20 for machining a workpiece 5 in accordance with the invention. Herein, first, model parameters for at least one model of the machine tool 20 stored in the CNC 30 are determined in an identification process.

In a first method step (hereinafter also called "step" for short) S1 of the method according to the invention, known boundary conditions, i.e., known values of certain parameters, which are required for the method are ascertained or provided in the CNC 30. Herein, they can be ascertained automatically, semi-automatically or manually. Herein, automatically means that the CNC 30 itself ascertains the parameters in question. This is, for example, achieved in that, after the start of an identification program 34 provided on the CNC 30, the CNC 30 automatically reads out axis positions of end position switches of the axes of the machine tool 20. Semi-automatically can mean that, during the execution of the identification program, the CNC 30 stops at certain time points and waits for user input. For example, the maximum travel speed of a certain axis can be input manually by a user. Furthermore, it is also possible for some or all of the parameters relating to the boundary conditions to be input manually into the CNC 30 by the user via the user interface before the start of the identification program.

The boundary conditions that are present at the start of the identification process in the CNC 30 include:
- the positions of end position switches of the axes of the machine tool 20 involved in the movement of the tool,
- the maximum travel speed of the axes in question, which, in the case of rotary axes, can also be angular speeds,
- an estimation of the inertia, in particular the mass to be moved by the respective drive or the moment of inertia applied to the respective drive,
- certain converter parameters for the converter assigned to the respective drive, in particular the maximum current that can be supplied to the respective drive.

During the execution of the identification program, in a method step S2, the CNC 30 generates a maximum movement range, a maximum acceleration and possibly a maximum jerk for each machine axis for an identification run from the aforementioned boundary conditions. This means that the maximum values for the identification run are not the corresponding maximum values of the respective parameters for ongoing operation, which are generally significantly higher, but "reliable" maximum values specifically for the identification run at which the axis, in particular the axis drive, does not reach its limits and nevertheless the parameters to be ascertained by the method according to the invention can still be ascertained with high accuracy.

If the boundary conditions and the further aforementioned parameters for the identification process are available, in a method step S3, the CNC 30 automatically ascertains identification runs for the individual axes. This means that travel profiles are defined for the individual axes on the basis of which the axes are moved and for which the aforementioned boundary conditions are complied with. Furthermore, the travel profiles are automatically determined by the CNC such that, at least in one section of the travel profile, a run and a constant speed and, at least in one section, an accelerated run with relatively high acceleration, in which in particular the maximum acceleration for the identification run is at least approximately achieved, are comprised by the travel profile.

In a subsequent method step S4, the axes are moved according to the travel profiles ascertained in step 3—while the axes are being moved—measurements are taken and measured values are generated, wherein the desired model parameters of the axes are subsequently determined from the measured values in a method step S5 on the basis of known physical relationships.

In a preferred embodiment of the invention, the axes are moved individually one after the other according to the travel profiles ascertained in step 3, preferably once at medium speed and/or medium acceleration and once at high speed and/or high acceleration, in order to cover possible working ranges of the machine axes and obtain good models.

Identification only takes a few minutes and provides a very good map of the real machine axes. Preferably, the travel profile for each axis is determined such that the axis is moved once in a first axis direction, for example the positive axis direction, at medium speed and medium acceleration and then in the opposite axis direction, i.e., the negative axis direction at high speed and high acceleration.

Herein, preferably, the axis is moved over at least a significant range of its maximum movement path, in particular the maximum movement path.

It is however also possible for the travel profiles to be determined in step 3 such that, during the identification process, a plurality of the machine axes, in particular all of the machine axes, to be moved simultaneously. Thus, instead of generating travel profiles for the individual axes for the identification process, a travel profile is, for example, generated for the tool 1 of the machine tool 20 such that all axes of the machine tool 20 are involved in the corresponding movement of the tool 1. This can significantly reduce the time required for the identification run. On the other hand, higher effort is required to ascertain a travel profile that is suitable for all axes according to the required specifications.

The aim of the measurement in step 4 is to determine a correlation between the motor rotational speed of the drive and the generated torque. Here, for a very simple axis with constant friction and mass ratios over the movement range, it may be sufficient to measure the motor current at a few points in time during the identification run. However, generally a large number of current values are measured distributed over the entire identification run, in particular at specific time intervals, for example every 2 ms, so that ultimately a characteristic curve of the current or torque over the rotational speed is determined.

Furthermore, a current limit is also ascertained for at least some of the measured current values in step 4. The current limit specifies the maximum current of the drive at the motor rotational speed in question. The current limit can, for example, be ascertained by reading out the "current reserve" for the measured current from the drive's converter. In this way, the current limit is calculated from the measured current in conjunction with the current reserve-generally by simple addition. Since the current limit is dependent on the rotational speed, its value is stored in the controller in dependence on the motor rotational speed.

Additionally or alternatively to the current limit, it is also possible for a torque limit to be ascertained. Since there is an at least approximately linear relationship between (motor) current and torque at least over a large rotational speed range of the motor, it generally makes no difference which value is measured. If necessary, the values can be converted into one another.

In principle, data sheets, if available, can also be used for the determination of the torque limits or current limits of the motor and the converter. The limit characteristic curve of the motor can also be calculated from motor data by means of a motor model or also supplied directly by the motor manufacturer.

In addition to the motor current, furthermore, actual kinematic variables for the identification run are also ascertained in step 4. The actual kinematic variables include: the position, the speed, the acceleration or the jerk. Preferably, during the identification run, at least the position of the axis is measured at certain time intervals, for example every 2 ms, by means of a position sensor. Other actual kinematic variables can be calculated therefrom if required, for example the speed by means of simply deriving the position based on time.

Alternatively, it is also possible for the required actual kinematic variables to be ascertained by taking them from the specifications or the travel profile for the identification run, therefore assuming them to be "true". However, it is more reliable to ascertain them on a metrological basis which also makes it possible to check the specifications (setpoint values) based on a comparison of actual and target values.

In method step S5, the desired model parameters of the machine or the desired models, in particular the mechanical model and the limit model, and possibly also the loss model are "identified" or ascertained from the data obtained—in particular by the aforementioned measurements—as part of the identification. This takes place using known methods. In step 5, the model parameters are in particular determined on the basis of the currents, current limits or torque limits and actual kinematic variables ascertained for different time points during the identification run.

The models ascertained will be discussed in more detail below. Finally, the models are used in a method step S6 to generate optimized movement processes, i.e., optimized trajectories for the individual axes or the end effector of the machine, in a manner that is known per se. This will also be discussed in more detail below. The identified models can be used directly on the machine, i.e., in the exemplary embodiment, the CNC, to control the position of the axes. Furthermore, the models or the model parameters comprised thereby can also be used for path generation in an external CAM system. Furthermore, the models can also be used for realistic simulations of movement processes performed by means of the machine (workpiece machining, etc.). The model parameters are also ideal for creating a digital twin of the machine.

The mechanical model comprises values relating to the masses and moments of inertia for the individual axes, relating to the friction and constant forces, for example the weight force. It is possible for additional effects to be modeled, such as, for example, process forces, acceleration forces due to an oscillating system, position-dependent forces in the case of eccentrically suspended axes. etc.

In particular, the mechanical model is determined from the measured values by means of a "model fit" (model adjustment). This can take place using numerous mathematical methods that are known per se, such as, for example, an optimization algorithm for minimizing the deviation of the model from the measurement data.

The model fit should be understood to be the use of at least one algorithm that is known per se that primarily smooths the measurement data in a certain way. This is due on the one hand to the model assumption (such as, for example, friction contained) and the mathematics used (for example the least squares method). The model fit works excellently as long as the measurement is noisy in the sense that the mean value is retained in the data, which can normally be assumed.

A few measuring points are sufficient for the model adjustment as long as the measured values contain enough information to ensure that every aspect of the model is well covered. High acceleration is, for example, required for ascertaining inertia for the mechanical model and the saturation for the loss model. High speed is, for example, required to determine the friction for the mechanical model. This is taken into account when selecting the travel profile for the identification run. In addition, preferably, two measurement runs are performed, once at medium speed and once at high speed.

The ascertained limit model describes the electrical limit of the motor, preferably including the saturation and the electrical power of the converter. For this purpose, the current limit and/or the torque limit is evaluated in dependence on the rotational speed.

Figure 13:
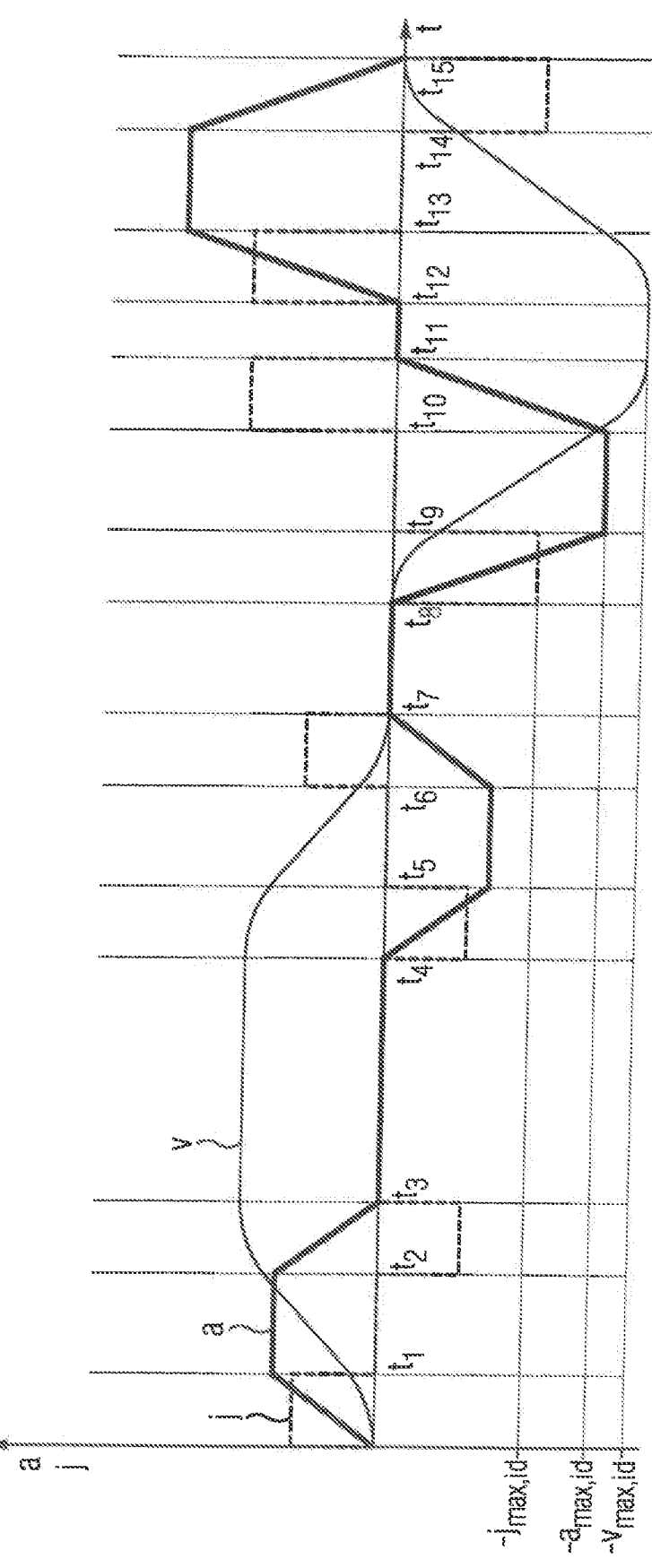

An example of an identification run is illustrated in FIG. 13. Herein, the following boundary conditions are specified for a machine axis to be moved as part of the identification run:

the maximum travel range of the axis for the identification run, in particular the positions of end position switches of the axis, which generally determine the maximum possible travel range of the axis, the maximum travel speed $v_{max,\ id}$ of the axes in question for the identification run, an estimation of the inertia, in particular the mass to be moved by the respective drive or moment of inertia applied to the respective drive, certain converter parameters for the converters assigned to the respective drive, in particular the maximum current that can be supplied to the respective drive.

Based on the aforementioned boundary conditions, during the execution of the identification program, the CNC advantageously automatically generates a movement range, a maximum acceleration $a_{max,\ id}$ and a maximum jerk $j_{max,\ id}$ for the identification run, wherein the variables $a_{max,\ id}$ and Imax, id are determined such that they can be achieved by the axis drive with high probability without thereby pushing the drive to its limits.

If the boundary conditions and the further aforementioned parameters for the Identification process are present, the CNC automatically ascertains a travel profile for the axis that complies with the above conditions or boundary conditions. FIG. 13 illustrates such a travel profile and shows the variation over time of the speed v, the acceleration a and the jerk j.

In the travel profile shown as an example, the axis is moved from a position x=0 (not depicted) to $x_{max}$ in a period between t=0 and $t_7$ with medium acceleration and medium speed in the positive axis direction and back again from $x_{max}$ to x=0 in a period between $t_8$ and $t_{15}$ with maximum speed, maximum acceleration and maximum jerk; the specifications (maxima) in each case refer to the identification run.

In detail, there is an acceleration phase between t=0 and $t_3$, namely increasing acceleration with constant jerk between t=0 and $t_1$, constant acceleration from $t_1$ to $t_2$ and falling acceleration with constant jerk between $t_2$ and $t_3$.

From $t_3$ to $t_4$, there is a section with constant speed.

Between $t_4$ and $t_7$, there is a braking phase until the axis comes to a standstill, namely an acceleration phase with increasing negative acceleration between $t_4$ and $t_5$, constant negative acceleration between $t_5$ and $t_6$ and decreasing negative acceleration between $t_6$ and $t_7$.

Between time points $t_7$ and $t_8$, the axis is at rest until the run in the negative axis direction begins at $t_8$ and continues until the axis reaches its initial position (x=0) again at $t_{15}$.

The individual phases between $t_8$ and $t_{15}$ are analogous to those between t=0 and $t_7$ in the FIG. 13, so that there is no need to discuss this in more detail. The differences to the first period are due to the fact that the run takes place in the opposite axis direction (return run) and the maximum values $v_{max,\ id}$, $a_{max,\ id}$ and $j_{max,\ id}$ determined for the identification run are reached with respect to speed, acceleration and jerk in each case.

During the entire identification run, at least the axis position is advantageously measured at short intervals, for example at intervals of 2 ms in each case. The measured axis positions can be used to determine the variables speed, acceleration and jerk at the respective time point by calculation (differential calculation). Alternatively, these variables can be ascertained on a metrological basis by means of appropriate sensors.

The determination of the variables speed, acceleration and jerk enables a check to be performed as to whether all specifications (for example the aforementioned maximum values) can be actually complied with during the movement of the axis. If the check finds that this is not the case, an error message is preferably issued to the user.

Furthermore, the motor current is measured during the entire identification run, advantageously likewise at short time intervals, for example at intervals of 2 ms in each case.

The measured current values in the different phases of the identification run can be used to draw conclusions about the desired model parameters such as the inertia of the axis or the friction, on the basis of known relationships. These variables are thus "identified".

Figure 3:
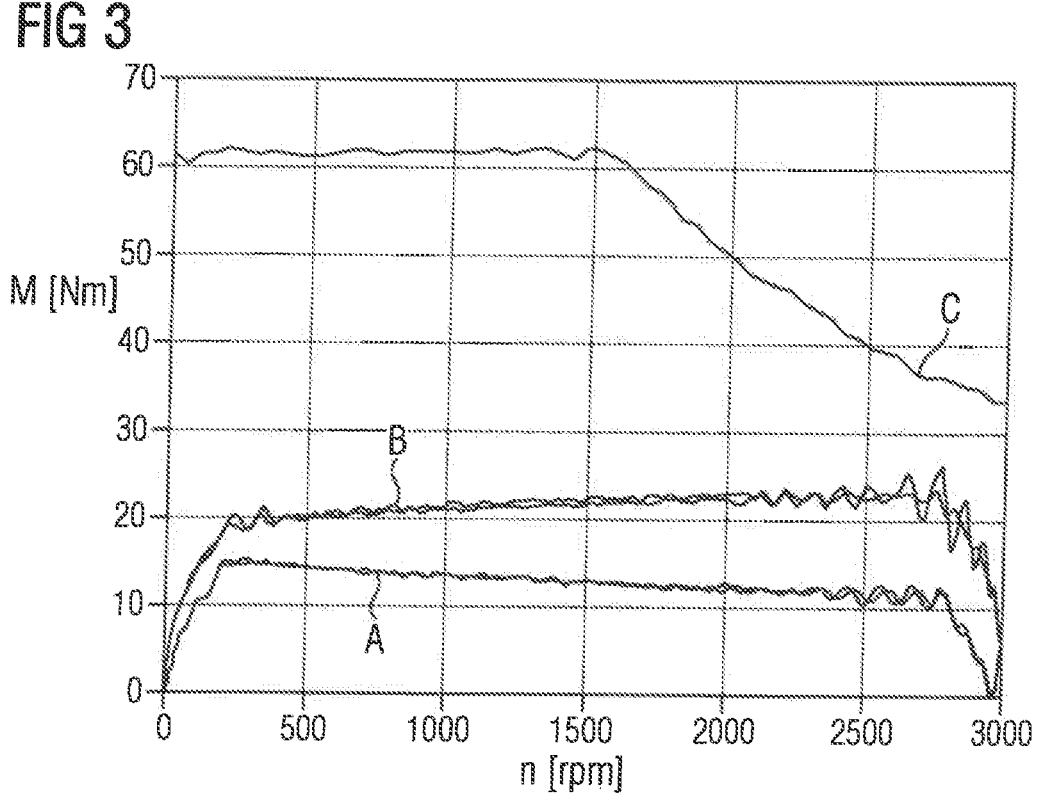
FIGS. 3-7 torque-rotational speed diagrams.

FIGS. 3 to 6 illustrate the automatic determination of the optimum acceleration for a specific machine axis. Herein, first, measurement runs are performed at different accelerations in which a large speed range, ideally the entire relevant rotational speed range, of the motor is run through. FIG. 3 depicts the torque over the motor rotational speed and the limit torque. The torque can be measured directly on the drive by means of suitable measuring means. However, it is simpler to measure the motor current or drive current during the identification run. The current values are anyway usually available in the drive's converter. Therefore, these have to be read out during the identification run-preferably at discrete time points, for example at intervals of 2 ms. There is a linear relationship (which is known for the motor is question) between the torque-forming motor current and the torque generated. For example, the torque Illustrated in FIG. 3 in the measurement curves A and B for different accelerations can therefore be determined directly from measured motor current.

The motor rotational speed is treated similarly to the determination of the torque. Here, once again, the desired values are generally anyway already available in the converter. If a suitable rotational speed sensor is available on the motor, the motor rotational speed can be read out at the time points in question at which the current value is determined. If the rotational speed values are not directly available, the position values of the axis can be recorded at the time points at which the motor current is ascertained. Thus, the travel speed of the axis and, in conjunction with the transmission ratio of the drive, the motor rotational speed for the relevant time points can be determined from adjacent position values by means of differentiation. Finally, knowledge of the motor current or the torque and the rotational speed results in the measurement curves A and B depicted in FIG. 3 which show the motor-torque M (in Nm) in dependence on the motor rotational speed n (in rpm). Herein, the upper curves B show an acceleration of the motor from 0 to 3000 rpm and the lower curves A show a deceleration from 3000 rpm to 0 (standstill).

A close look at FIG. 3 and curves A and B shows that 2 curves are depicted for A and B in each case. These result from 2 measurements performed one after the other under the same boundary conditions and show high repeatability of the measurements, which is important for the quality of the models ascertained therefrom.

Curve B (positive acceleration of the axis) lies above curve A (negative acceleration or deceleration) since, in B, the motor has to work against the friction of the axis and, in A, the friction supports the deceleration.

Furthermore, as already explained, the characteristic curve of the maximum torque (limit torque) of the motor over the rotational speed can be specified from a data sheet for the motor or from converter data. The corresponding limit characteristic curve C is likewise depicted in FIG. 3.

Thus, overall, the diagram illustrated in FIG. 3 results from an identification run in which the motor is in each case accelerated differently in a rotational speed range between 0 and 3000 rpm, once in a rotational speed range of approximately 250 rpm to approximately 2750 rpm with constant, positive acceleration (measurement curve B) and once in a rotational speed range of approximately 2750 rpm to approximately 250 rpm with constant negative acceleration (measurement curve A).

The measurements illustrated in FIG. 3 can then be used to derive model parameters such as the inertia of the axis in a manner as described above.

Figure 4:
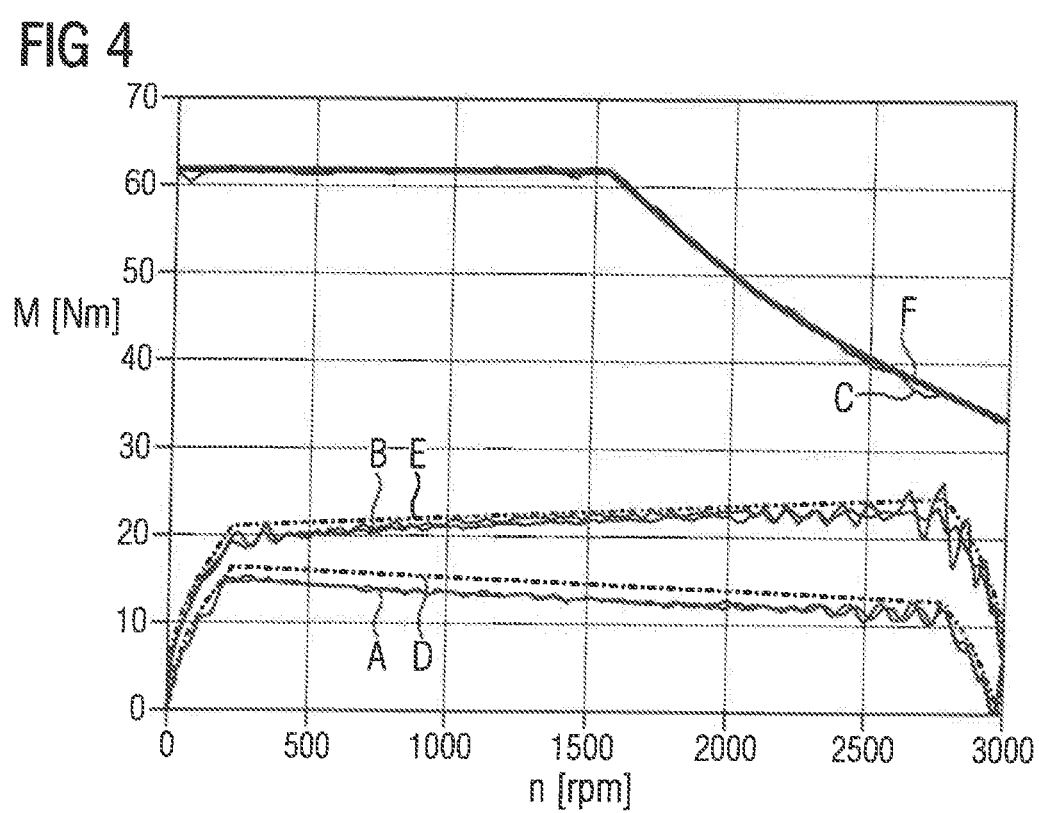

The smooth characteristic curves in FIG. 4 illustrate the relationship between motor rotational speed and torque when the same identification run as that in FIG. 3 is simulated using the model. In contrast to the measured irregular ("wavy") measurement curves A to C, this results in the "smooth" characteristic curves D to F that reflect the behavior of a "model motor" corresponding to the real motor with ideal behavior—i.e., smooth characteristic curves.

Figure 5:
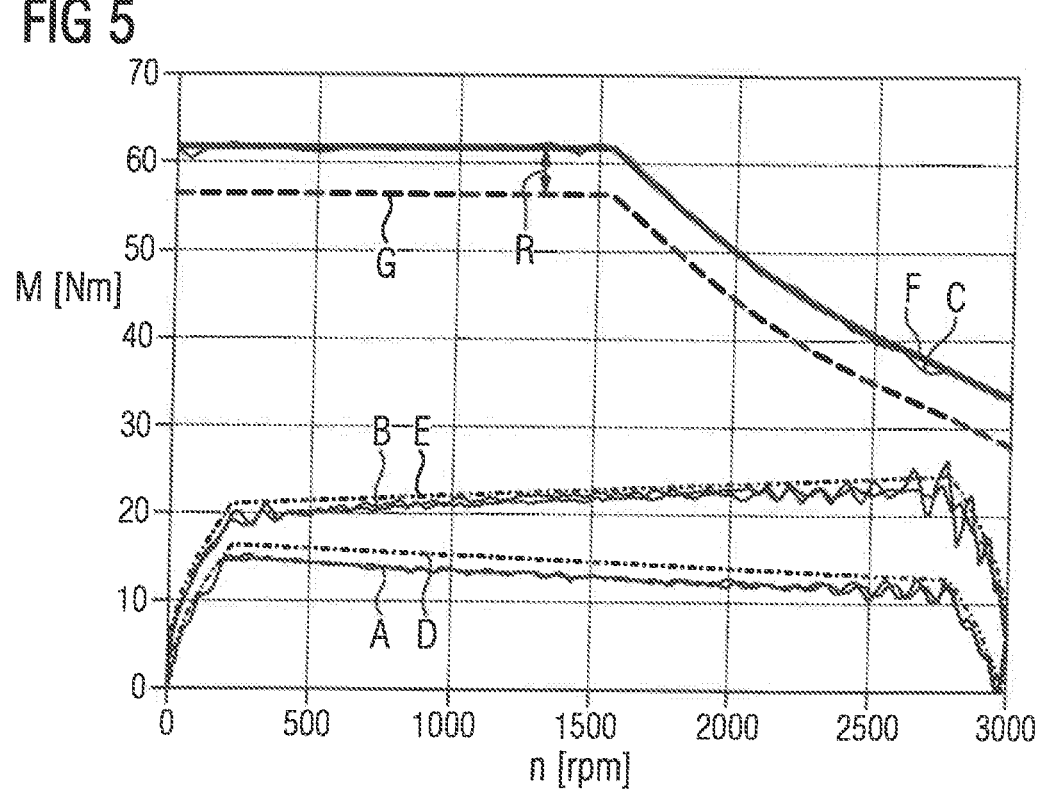

FIG. 5 illustrates the motor limit characteristic curve F taking Into account a user-defined "reserve" R. In the exemplary embodiment, the reserve characteristic curve G is shifted downward by a certain amount, for example 5 Nm, compared to the limit characteristic curve F. Thus, the "maximum acceleration" for the regular operation of the drive or the axis can also be determined taking this reserve R into account.

Figure 6:
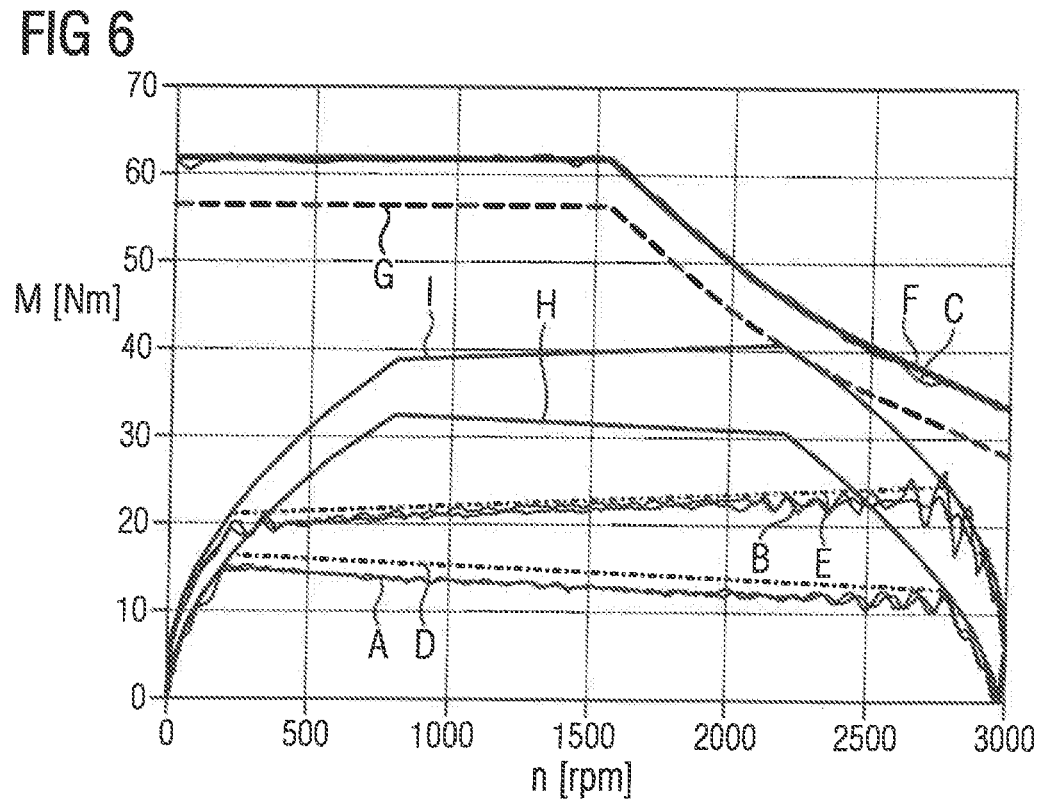

FIG. 6 now illustrates the optimum acceleration for the axis, for example, if, for example, the identification run (acceleration of the motor from 0 rpm to 3000 rpm and subsequent deceleration of the motor from 3000 rpm to 0 rpm) was to be performed in the shortest possible time while maintaining the reserve. Herein, it can be seen that, in this case, the rotational-speed-torque-characteristic curve I just touches the reserve characteristic curve G. Accordingly, the characteristic curve I ascertained in this way on the basis of the models or model parameters fully utilizes the possibilities of the drive (in the exemplary embodiment, taking the reserve R into account).

Accordingly, as illustrated in FIG. 6, the models generated according to the invention can be used to ascertain optimized trajectories for the regular operation of the drive.

Figure 7:
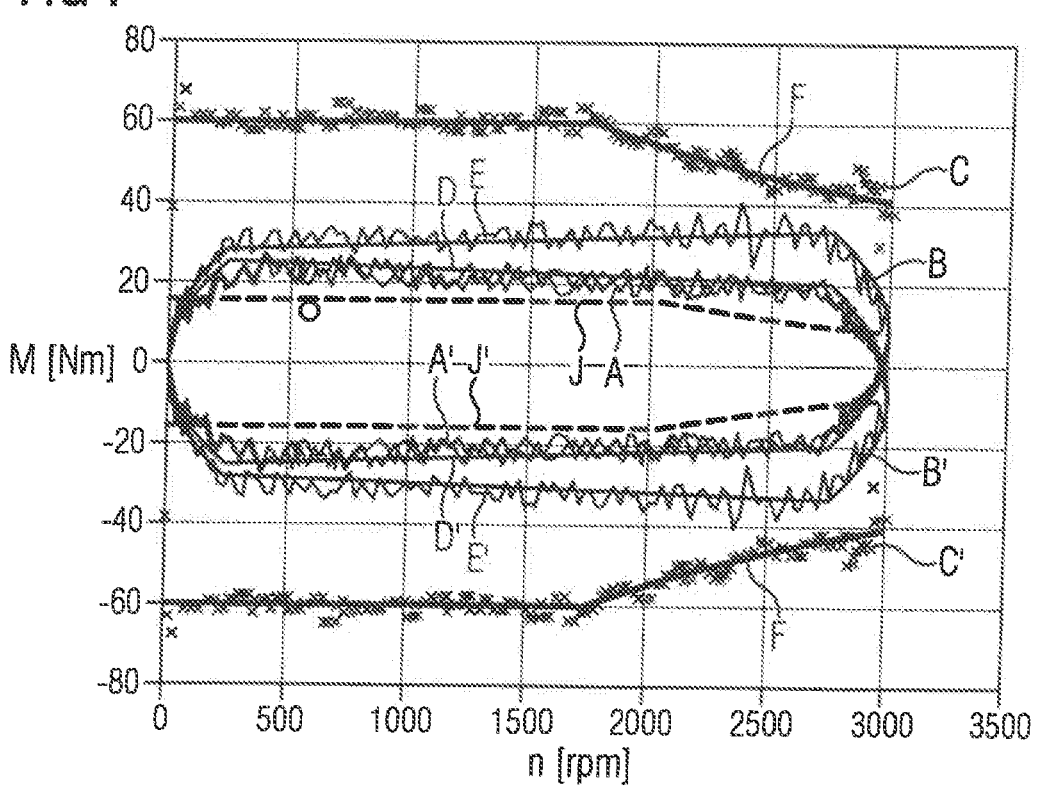

FIG. 7 shows another example of torque-rotational-speed diagrams of the motor of an axis. The wavy curves A and B in the middle of the depiction show the curves for the torque over the rotational speed resulting from current measurements. Here, the smooth curves D and E also show the corresponding characteristic curves of the identified model of the real axis in comparison to the measured values.

In contrast to FIGS. 3 to 6, FIG. 7 also shows negative torque values. These are due to the fact that the axis in question is moved in the negative axis direction with an analogous travel profile (acceleration from 0 rpm to 3000 rpm and subsequent deceleration to 0 rpm) thus reversing the motor's direction of rotation. Thus, the current measurements or torque measurements result in measurement curves A' and B' and the corresponding smooth curves D' and E' of the model.

As can be seen in FIG. 7, here, once again, the mechanical model (smooth curves) with the identified parameters is a very good match with reality (measured "wavy" curves) and forms the basis for all further considerations.

The upper and lower wavy curves C and C' in the depiction show the measured values of the maximum torque of the motor with saturation, including the power section. The smooth (solid) curves F and F' are the corresponding limit characteristic curves of the limit model of the drive axis. The dashed curves J and J' show the so-called. "S1 characteristic curves" of the axis, i.e., the characteristic curve of the drive for the case of stationary operation with the apparent torque, which is unrealistic in practice when operating a machine tool. Preferably, the S1 characteristic curve is derived from a data sheet for the axis motor.

Figure 8:
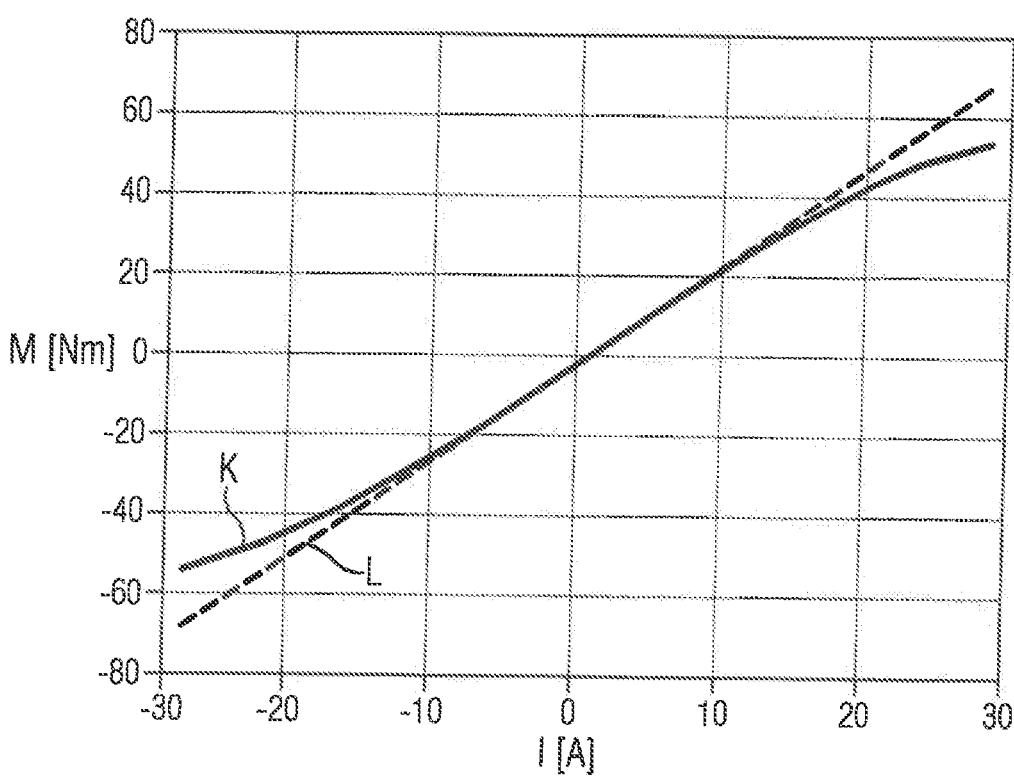
FIG. 8 a current-torque diagram.

To determine a loss model, it is necessary to measure current values that take saturation effects into account. This is because the losses increase at higher currents and the drive torque generated is no longer linear to the current. FIG. 8 shows the relationship between current I (in A) and torque M (in Nm) for a drive from which the difference between the real measured characteristic curve (solid characteristic curve K) and the ideal characteristic curve L (dashed) can be seen.

The criterion for the loss model is the minimization of the power loss, i.e., minimum heat development in the motor. For this purpose, the copper and iron losses of the motor are calculated from the measurement data. The copper losses are dependent on the current or torque squared, while the iron losses are dependent on the rotational speed. The characteristic curves obtained in this way are then used for energy-optimized movement with optimum utilization of the motor power.

The invention is characterized by the fact that just a few identification runs generate model parameters or models of the machine in question on the basis of which optimized travel profiles can then be generated for the regular (ongoing) operation of the machine.

An optimization approach is used to determine, in particular calculate, an optimized travel profile, in particular an optimal travel profile, taking into account the mechanical model and the torque-limit-rotational-speed-limit characteristic curve. Likewise, the axis current limit could be used for the optimization.

An optimal travel profile can mean;

maximum acceleration for a specified movement path, maximum speed and jerk limitation;

minimum movement time for the specified movement path and maximum speed;

minimum power losses for the specified movement path and maximum speed.

The optimization is determined for additional loading on the axis that can be freely selected by the user to a large extent. This means that the user can calculate and use the optimum travel profile for different loadings that may occur during the operation of the axis but have not been measured, in order, for example, to set up an adaptation on the controller or to be prepared for a worst-case scenario.

The mechanical model and the desired travel profile are used as the basis for calculating an expected torque curve. This must not exceed the limit characteristic curve at any point. In the case of a travel profile optimized according to the invention, the torque curve touches the limit characteristic curve at at least one point.

Instead of the characteristic curve for the maximum current, it is also possible to use the characteristic curve for the continuous loading (S1) as a limit. In this case, a check is performed as to whether a thermal equivalent of the travel profile (for example, effective value of the expected torque) is below this S1 characteristic curve.

The optimization of the travel profile also takes into account the use of additional filters on the controller to smooth the travel profile. Typical examples are averagers, VibX or general FIR filters. Smoothing usually enables acceleration to be increased, since the travel profile "dives" further below the limit characteristic curve.

Examples of optimized travel profiles are shown in the FIGS. 9 to 12. These once again depict the torque-rotational speed diagrams for a travel profile in which the motor is accelerated from 0 to 3000 rpm and then decelerated again to 0, to be precise in both the positive direction of rotation (upper half of the diagrams) and the negative direction of rotation (lower half of the diagrams) of the motor. The solid curves F and F' show the motor limits, i.e., the maximum torque in dependence on the rotational speed. The dashed characteristic curves J and J' show the S1 characteristic curves (for the different directions of rotation of the motor). Further specifications for the exemplary embodiment depicted are: travel range s=700 mm, maximum speed $v_{max}$=36 m/min, maximum jerk $j_{max}$=100 m/s$^2$.

The curves D and E or D' and E' in each case show the travel profile as a standard case before optimization with $a_{max}$=3.0 m/s$^2$.

An optimization with the criterion "maximum acceleration" was then carried out for the travel profile shown.

The curves H and I or H' and I' show the result of the optimization in which the rotational-speed-torque-characteristic curve I and I' just touch the limit characteristic curves F or F', i.e., the physical possibilities of the motor are fully utilized and in each case the maximum torque of the motor is called up in one operating state, which corresponds to maximum acceleration at this motor rotational speed.

Figure 9:
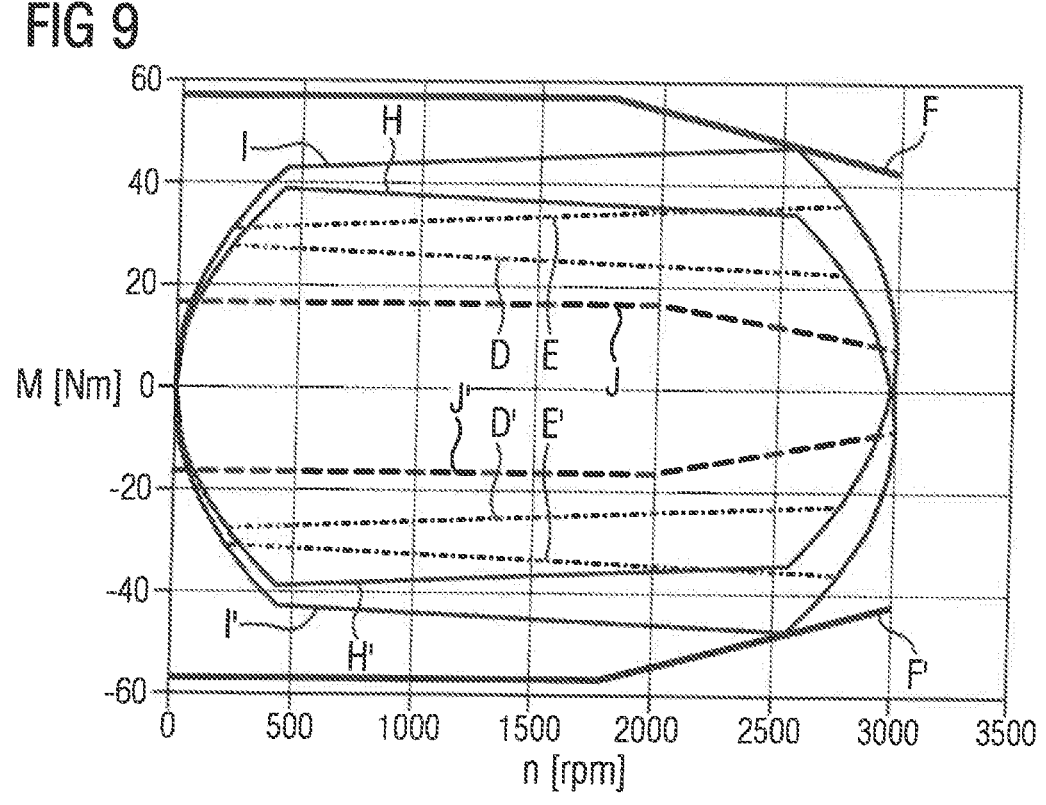
FIG. 9 a torque-rotational speed diagram for an axis without loading and without a filter, FIG. 10 a torque-rotational speed diagram for an axis without loading and with a filter, FIG. 11 a torque-rotational speed diagram for an axis with loading and without a filter, FIG. 12 a torque-rotational speed diagram for an axis with loading and with a filter and FIG. 13 an identification run.

FIG. 9 illustrates a case without loading and without a filter. Here, optimized acceleration $a_{max,opt}$=4.17 m/s$^2$ can be achieved for the exemplary embodiment.

As can be clearly seen, the rotational-speed-torque-characteristic curves I or I' in each case lie at one point directly on the limit characteristic curves F or F', the maximum possible motor torque in dependence on the rotational speed. As a result, the motor power is utilized to the maximum.

There are various mathematical approaches for achieving the optimum. One approach that is easy to implement and relevant in practice consists in gradually increasing the motor current or the torque or the acceleration in small steps and using the mechanical model to generate the corresponding curves until—as shown in FIG. 9—the curves I and F or I' and F' touch or intersect. Thus, the optimum in terms of torque and also acceleration has been found.

Figure 10:
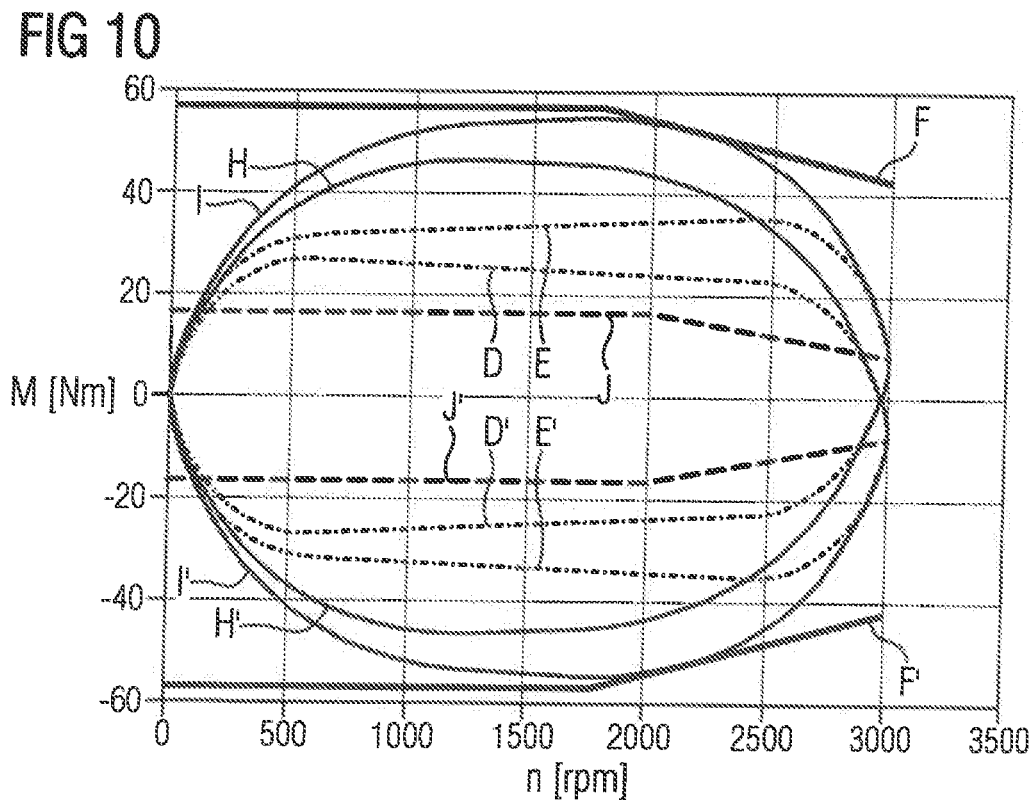

FIG. 10 is largely analogous to FIG. 9 with the difference that herein a filter in the form of an average with t=50 ms was used. Herein, optimized acceleration $a_{max,opt}$=5.14 m/s$^2$ could be achieved for the exemplary embodiment.

Figure 11:
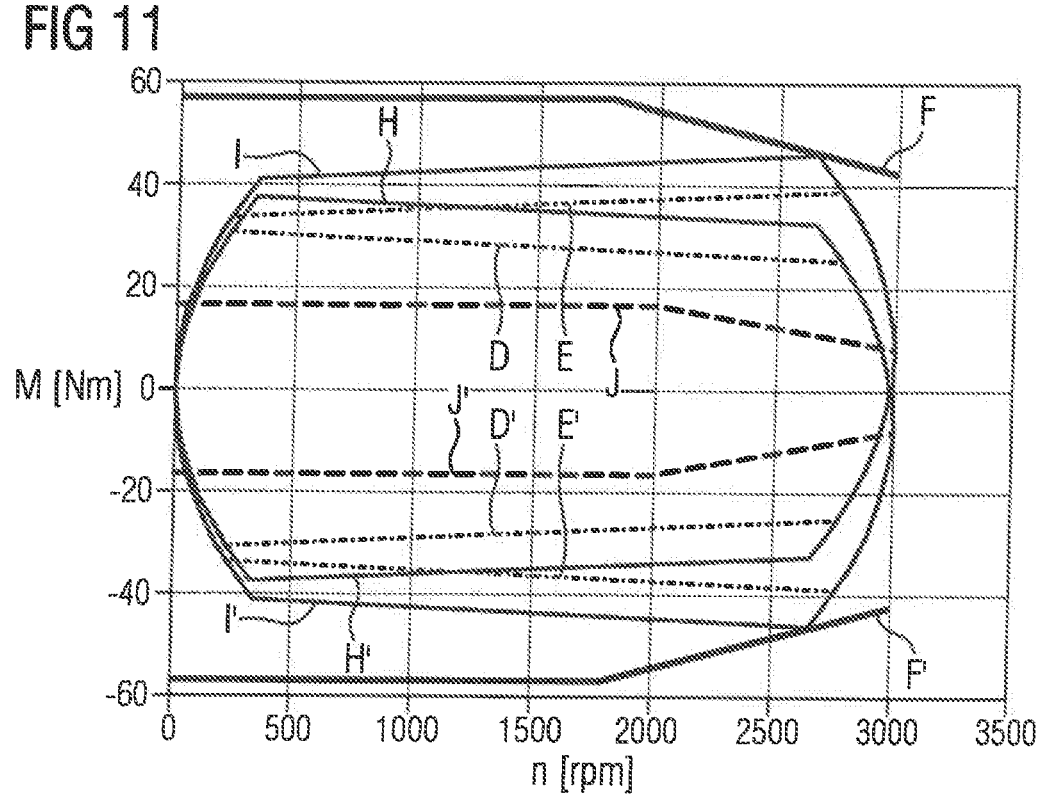

FIG. 11 shows an exemplary embodiment that is once again largely analogous to FIG. 9 with the difference that a loading of 500 kg was selected. For this exemplary embodiment, optimized acceleration $a_{max,opt}$=3.66 m/s$^2$ could be achieved without a filter.

Figure 12:
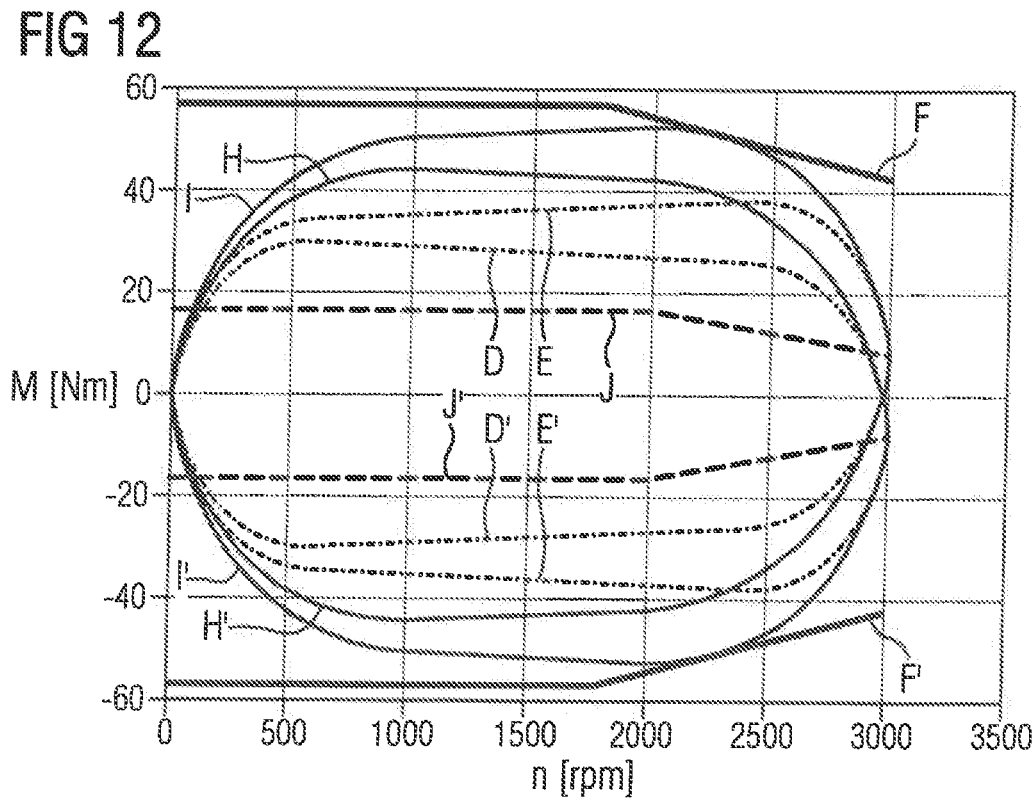

The exemplary embodiment according to FIG. 12 differs from that in FIG. 11 in that—additionally to the loading—a filter in the form of an averager with t=50 ms was used. The optimized acceleration is thus $a_{max,opt}$=4.42 m/s$^2$.

As can be seen from FIGS. 11 and 12, even with loading, the optimized maximum acceleration is in each case significantly higher than in the initial state. With an averager as a filter (FIGS. 10 and 12), the maximum acceleration for this travel profile increases noticeably once again.

In summary, the invention is characterized by:

a GUI-guided (GUI=graphical user interface) method for drive axes of production machines of all types (for example machine tools, production machines or handling machines);

"smart" identification of axis properties for optimum utilization of the limit characteristic curve;

determination of the parameters for a reliable identification run from known boundary conditions of the drive axes;

identification run of the drive axes to determine the mechanical model, limit model and possibly loss model of the drive axes, with:

ascertaining of friction and inertia of the axis, torque limit of the motor including saturation and current limit of the converter on a metrological basis;

an identification run with noisy signals and few sampling points is sufficient since the algorithm and the optimization nevertheless guarantee a high-quality parametric mechanical model;

taking account of mechanical limits (gear torque limit);

taking account of the weight compensation for vertical axes;

based on the identified models: determination of the dynamic parameters (maximum acceleration $a_{max}$, (maximum) jerk $j_{max}$: filter parameters) for movement processes for optimum utilization of the motor limits for different criteria:

maximum acceleration ($a_{max}$, filter parameter);

minimum time ($a_{max}$, $j_{max}$, filter parameter);

energy efficient method (a, j);

dynamic optimization (parts program);

to further smooth the travel profile, position setpoint value filters can be taken into account. These enable even better utilization of the available torque over a large rotational speed range and thus ultimately better acceleration capacity for high speeds;

the calculation can be repeated for any desired configuration on the basis of the identification already performed; the configuration changes relate to:

any desired movement path;

any desired dynamic limit (acceleration, jerk);

any desired loading (changing workpiece);

The invention provides the following advantages:

utilization of the maximum possible mechanical and electrical limits of the drive axis taking into account the parameters described;

optimal performance for different criteria;

optimal motor utilization, better motor management;

shorter processing times;

increased productivity.

What is claimed is:

1. A method for operating a manufacturing machine system comprising a manufacturing machine having at least one axis with a position-controlled drive by which at least a first machine element is adjustable relative to a second machine element and a control facility, the method comprising:

storing in the control facility at least a maximum movement range and a maximum movement speed for the at least one axis and a maximum electrical power that is suppliable to the drive of the at least one axis as boundary conditions for at least one identification run; and by the control facility:

determining or receiving a maximum acceleration and/or a maximum jerk for the at least one Identification run;

determining a travel profile for the at least one identification run in compliance with the boundary conditions and the maximum acceleration and the maximum jerk for the at least one identification run;

performing the at least one identification run according to the ascertained travel profile;

ascertaining a current supplied to the drive during the at least one identification run;

ascertaining at least one actual kinematic variable during the at least one identification run;

ascertaining at least one model parameter of at least one model of the at least one axis in dependence on the ascertained current and the at least one actual kinematic variable;

ascertaining a current limit and/or torque limit of the drive in dependence on a rotational speed of the drive;

ascertaining at least one trajectory of the at least one axis optimized with respect to a minimum travel time or a maximum acceleration or a minimum energy loss on the basis of the at least one model parameter and the ascertained current limit and/or torque limit; and operating the manufacturing machine system according to the at least one model parameter.

2. The method of claim 1, wherein the at least one model parameter relates to an inertia of the at least one axis.

3. The method of claim 2, wherein the inertia is a total inertia of the at least one axis.

4. The method of claim 1, wherein the at least one model parameter relates to a friction of the at least one axis.

5. The method of claim 4, wherein the friction is a Coulomb friction and/or a viscous friction of the at least one axis.

6. The method of claim 1, wherein the travel profile for the at least one identification run comprises at least one section with a constant speed and at least one section with an acceleration.

7. The method of claim 6, wherein the acceleration is a constant acceleration.

8. The method of claim 1, wherein, during the at least one identification run, a position and/or a speed and/or an acceleration of the at least one axis is/are ascertained in dependence on the travel time and the model parameter is ascertained in dependence on the ascertained position and/or speed and/or acceleration.

9. The method of claim 8, wherein, during the at least one identification run, a position and/or a speed and/or an acceleration of the axis is/are measured in dependence on the time and the model parameter is ascertained in dependence on the ascertained position and/or speed and/or acceleration.

10. The method of claim 1, wherein at least one limit characteristic curve relating to a rotational-speed-dependent maximum current consumption of the drive of the at least one axis is stored in a limit model in the control facility.

11. The method of claim 1, wherein at least one characteristic curve relating to losses of the drive of the at least one axis in dependence on a motor current is stored in a loss model in the control facility.

12. The method of claim 1, wherein a trajectory of the at least one axis optimized with respect to the acceleration is determined such that, when the at least one axis is moved according to the trajectory, a rotational-speed-torque-characteristic curve of the drive of the at least one axis does not exceed the torque limit and touches the torque limit at at least one point.

13. The method of 1, wherein the manufacturing machine has a plurality of axes, each with a position-controlled drive, by which at least two machine elements are adjustable relative to one another, wherein an end effector the manufacturing machine is positionable in a working space of the manufacturing machine by the axes and wherein parameters or characteristic curves of all axes of the manufacturing machine involved in the positioning of the end effector are stored in the respective model.

14. The method of claim 1, wherein position setpoint value filters are used to smooth at least one optimized travel profile for the operation of the manufacturing machine.

15. A manufacturing machine system, comprising:

a manufacturing machine having at least one axis with a position-controlled drive by which at least a first machine element is adjustable relative to a second machine element; and a control facility configured to:

store in the control facility at least a maximum movement range and a maximum movement speed for the at least one axis and a maximum electrical power that is suppliable to the drive of the at least one axis as boundary conditions for at least one identification run;

determine or receive a maximum acceleration and/or a maximum jerk for the at least one identification run;

determine a travel profile for the at least one identification run in compliance with the boundary conditions and the maximum acceleration and the maximum jerk for the at least one identification run;

perform the at least one identification run according to the ascertained travel profile;

ascertain a current supplied to the drive during the at least one identification run;

ascertain at least one actual kinematic variable during the at least one Identification run;

ascertain at least one model parameter of at least one model of the at least one axis in dependence on the ascertained current and the at least one actual kinematic variable;

ascertain a current limit and/or torque limit of the drive in dependence on a rotational speed of the drive;

ascertain at least one trajectory of the at least one axis optimized with respect to a minimum travel time or a maximum acceleration or a minimum energy loss on the basis of the at least one model parameter and the ascertained current limit and/or torque limit; and operate the manufacturing machine system according to the at least one model parameter.

16. A manufacturing machine for a manufacturing machine system as set forth in claim 15.

17. A control facility for a manufacturing machine system as set forth in claim 15.

18. A digital twin for a manufacturing machine as set forth in claim 16.

* * * * *